(12) United States Patent
Cho et al.

(10) Patent No.: US 10,290,981 B2
(45) Date of Patent: May 14, 2019

(54) POWER OUTLET DEVICE

(71) Applicants: HYUNDAI MOTOR COMPANY, Seoul (KR); KIA MOTORS CORPORATION, Seoul (KR); OMRON AUTOMOTIVE ELECTRONIC KOREA CO., LTD., Anseong-si, Gyeonggi-do (KR)

(72) Inventors: Seong Hwan Cho, Hwaseong-si (KR); Won Hee Choi, Gwangmyeong-si (KR)

(73) Assignees: HYUNDAI MOTOR COMPANY, Seoul (KR); KIA MOTORS CORPORATION, Seoul (KR); OMRON AUTOMOTIVE ELECTRONIC KOREA CO., LTD., Anseong-si, Gyeonggi-do (KR)

( * ) Notice: Subject to any disclaimer, the term of this patent is extended or adjusted under 35 U.S.C. 154(b) by 591 days.

(21) Appl. No.: 14/791,056

(22) Filed: Jul. 2, 2015

(65) Prior Publication Data

US 2016/0137083 A1    May 19, 2016

(30) Foreign Application Priority Data

Nov. 19, 2014 (KR) .................. 10-2014-0161768

(51) Int. Cl.
*B60L 1/00* (2006.01)
*H01R 13/66* (2006.01)
(Continued)

(52) U.S. Cl.
CPC ....... *H01R 13/6683* (2013.01); *H01R 13/641* (2013.01); *H01R 13/703* (2013.01); *H01R 13/7031* (2013.01); *B60L 1/006* (2013.01)

(58) Field of Classification Search
CPC ... H01R 13/6683; H01R 13/703; H01R 29/00
See application file for complete search history.

(56) References Cited

U.S. PATENT DOCUMENTS 6,552,888 B2 *  4/2003  Weinberger .......... H01R 13/713
                                              307/125
6,984,141 B1 *  1/2006  Beski, Sr. .......... H01R 13/4532
                                              439/188
(Continued)

FOREIGN PATENT DOCUMENTS

JP        07-065889 A       3/1995
JP        2009-146782 A     7/2009
(Continued)

*Primary Examiner* — Jeffrey M Shin
(74) *Attorney, Agent, or Firm* — Morgan Lewis & Bockius LLP

(57) ABSTRACT

The present disclosure relates to a power outlet device that senses whether a plug is inserted into a terminal and controls determining supply or interruption of power to a 5 socket according to the sensed result. The power outlet device includes: a housing having a plug insertion hole inserted with an external plug; a substrate provided in the housing; a terminal provided on the substrate to be deployed to face the plug insertion hole; and a switching 10 unit controlling whether to supply power to the terminal by sensing that the plug is inserted into the terminal, wherein the terminal is electrically connected to the switching unit.

12 Claims, 3 Drawing Sheets

(51) Int. Cl.
*H01R 13/641* (2006.01)
*H01R 13/703* (2006.01)

(56) References Cited

U.S. PATENT DOCUMENTS

| | | | |
|---|---|---|---|
| 8,125,181 B2 * | 2/2012 | Gregg | B60W 10/26 |
| | | | 180/65.29 |
| 2002/0112945 A1 | 8/2002 | Lawson et al. | |
| 2008/0049367 A1 * | 2/2008 | Carson | H02H 3/12 |
| | | | 361/87 |
| 2011/0246013 A1 * | 10/2011 | Yee | B60L 11/1859 |
| | | | 701/22 |
| 2013/0127261 A1 * | 5/2013 | Kagawa | H01R 13/707 |
| | | | 307/125 |

FOREIGN PATENT DOCUMENTS

| | | |
|---|---|---|
| KR | 10-0244111 B1 | 2/2000 |
| KR | 10-2007-0050010 A | 5/2007 |
| KR | 10-0908109 B1 | 7/2009 |
| KR | 10--2010-0044876 A | 4/2010 |
| KR | 10-2010-0044976 A | 5/2010 |
| KR | 10-2012-0010498 A | 2/2012 |
| KR | 10-2014-0025255 A | 3/2014 |

\* cited by examiner

POWER OUTLET DEVICE

CROSS-REFERENCE TO RELATED APPLICATION

This application is based on and claims the benefit of priority to Korean Patent Application No. 10-2014-0161768, filed on Nov. 19, 2014 in the Korean Intellectual Property Office, the disclosure of which is incorporated herein in its entirety by reference

TECHNICAL FIELD

The present disclosure relates to a power outlet device, and more particularly, to a power outlet device that senses whether a plug is inserted into a terminal and controls determining supply or interruption of power to a socket according to the sensed result.

BACKGROUND

A power outlet device that enables a general electronic apparatus to be used is installed in a vehicle.

The power outlet for the vehicle includes a terminal provided in a housing and a plug insertion hole provided on an exterior of the housing and inserted with a plug of an electronic apparatus. The terminal is electrically connected with a battery of the vehicle to maintain a state in which power is continuously applied to the terminal. Therefore, when the plug of the electronic apparatus is inserted through the plug insertion hole to contact the terminal, the power is immediately supplied to the plug.

Since the plug insertion hole is exposed to the outside, foreign materials or conductive materials may easily intrude into in the power outlet in the related art, and as a result, there exists a risk of an ignition or electric shock.

Therefore, in recent years, a power outlet product to which a separate operating switch is separately applied has been introduced for safety of a driver or active handling.

For example, Korean Patent Laid-Open Publication No. 10-2010-0044876 discloses a power outlet device in which a connector presses a movable contact downward and the power is applied while the movable contact moves downward, so the fixed contact is connected.

However, as the power outlet having an operating switch in the related art has a structure in which the movable contact and the fixed contact are mechanically connected, when the movable contact and/or the fixed contact are damaged due to a mechanical or physical damage, it becomes impossible to supply the power.

SUMMARY

The present disclosure has been made to solve the above-mentioned problems occurring in the prior art while advantages achieved by the prior art are maintained intact.

An aspect of the present disclosure provides a power outlet device that significantly improves stability and implements structural simplification by implementing a safety function to supply power to a terminal by an electronic configuration only when an external plug is inserted.

According to an exemplary embodiment of the present disclosure, a power outlet device includes: a housing having a plug insertion hole inserted with an external plug; a substrate provided in the housing; a terminal provided on the substrate to face the plug insertion hole; and a switching unit controlling whether to supply power to the terminal by sensing that the plug is inserted into the terminal, wherein the terminal is electrically connected to the switching unit.

The switching unit may include an insertion sensor sensing that the plug is inserted into the terminal and the insertion sensor senses that the plug is fully inserted into the bottom of the terminal.

The switching unit may further include a controller outputting a switching signal by receiving a sensing signal from the insertion sensor, and a power supply switching unit configured to supply the power to the terminal by the switching signal of the controller.

A start sensing unit that outputs a start-on signal by sensing a start of a vehicle may be electrically connected to the controller, and the controller may be configured to output the switching signal in accordance with the sensing signal of the insertion sensor in the state where receiving the start-on signal of the start sensor.

The insertion sensor may have an optical sensing structure to sense that the plug is fully inserted into the bottom of the terminal.

The terminal may have a pair of conductive strips which are spaced apart from each other and a sensing opening opened in a lateral direction is formed between the pair of conductive strips, and the insertion sensor may be configured to optically sense that the plug is fully inserted into the bottom of the terminal through the sensing opening of the terminal.

The insertion sensor may include a sensing block installed on the substrate and having a structure to besiege the sensing opening of the terminal, a light emitting unit installed at one side of the sensing block, and a light receiving unit installed at the other side of the sensing block, and an optical signal transmitted by the light emitting unit may be received by the light receiving unit after passing through the sensing opening.

The sensing block may include a first mounting wall and a second mounting wall deployed to face each other, and the light emitting unit may be mounted on the first mounting wall and the light receiving unit may be mounted on the second mounting wall.

A first mounting groove on which the light emitting unit is mounted may extend on the first mounting wall in a longitudinal direction and a second mounting groove on which the light receiving unit is mounted may extend on the second mounting wall in the longitudinal direction.

A rotation plate having a plug insertion hole may be rotatably installed on the top of the housing.

According to another exemplary embodiment of the present disclosure, a power outlet device includes: a housing having a plug insertion hole inserted with an external plug; a terminal deployed to face the plug insertion hole in the housing; and a switching unit controlling whether to supply power to the terminal by sensing that the plug is inserted into the terminal.

The switching unit may include an insertion sensor sensing that the plug is inserted into the terminal, a controller outputting a switching signal by receiving a sensing signal from the insertion sensor, and a power supply switching unit configured to supply the power to the terminal by the switching signal of the controller.

A start sensing unit that outputs a start-on signal by sensing a start of a vehicle may be electrically connected to the controller, and the controller may be configured to output the switching signal in accordance with the sensing signal of the insertion sensor in the state where receiving the start-on signal of the start sensor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
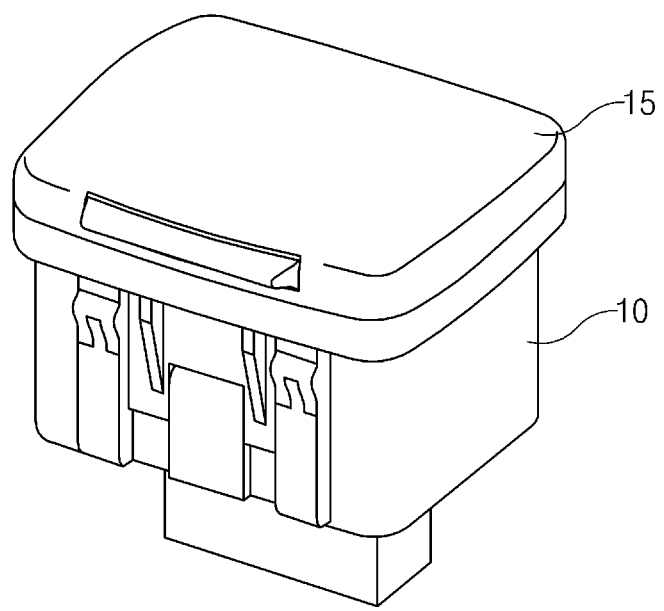
FIG. 1 is a perspective view of a power outlet device according to an exemplary embodiment of the present disclosure.

Hereinafter, exemplary embodiments of the present disclosure will be described in detail with reference to the accompanying drawings. For reference, the sizes of the components, the thickness of lines, and the like illustrated in the drawings referred for describing the present disclosure may be somewhat exaggeratingly expressed for easy understanding. Further, since terms used to describe the present disclosure are defined by considering functions in the present disclosure, the terms may be construed in different ways by the intention of users and operators, customs, and the like. Therefore, the terms should be defined based on the entire contents of the present specification.

Figure 2:
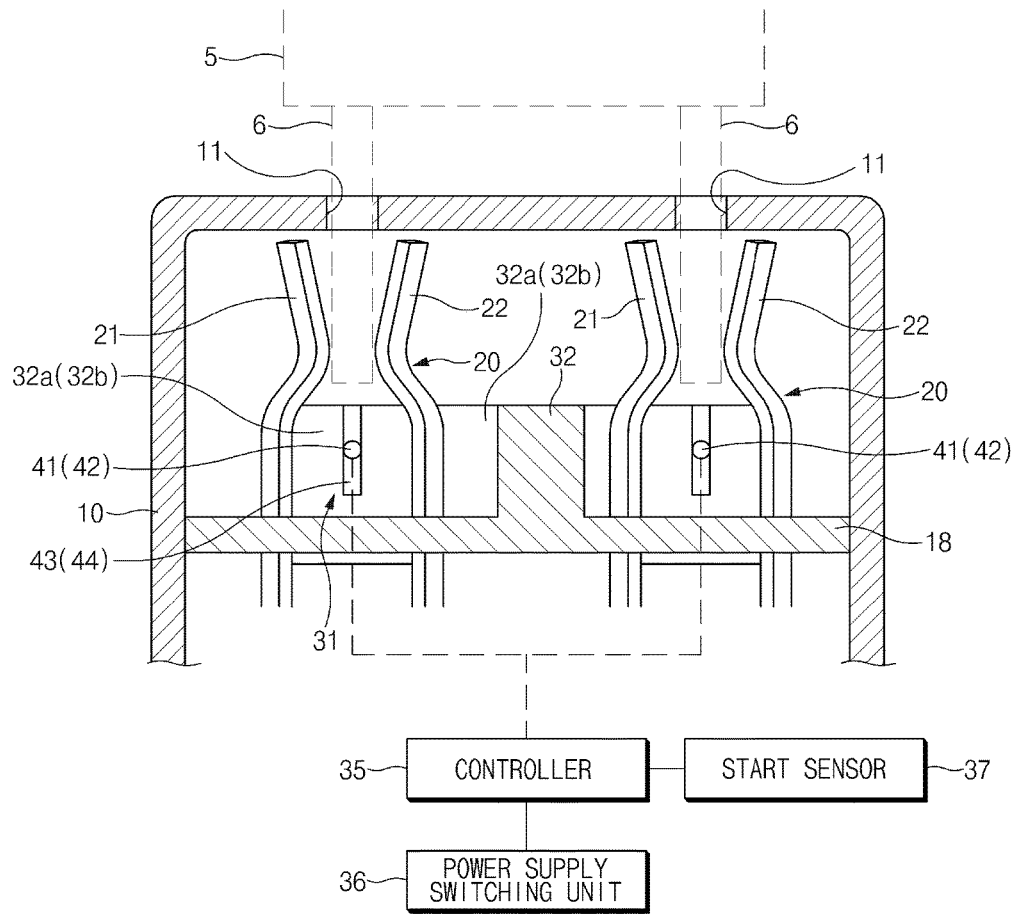
FIG. 2 is a side cross-sectional view of the power outlet device according to the present disclosure.
Figure 3:
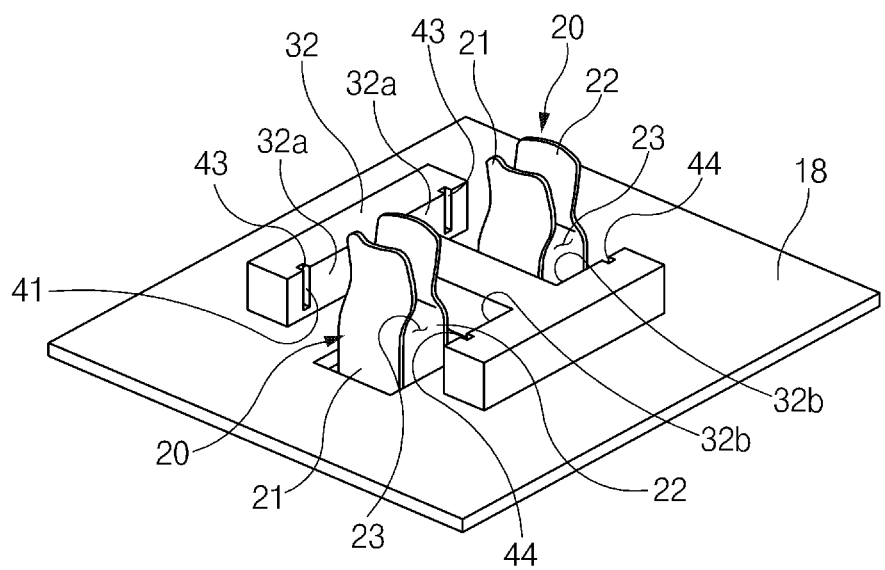
FIG. 3 is a perspective view illustrating configurations of a terminal and an insertion sensing unit in the state where the housing is omitted in the power outlet device according to the present disclosure.

FIGS. 1 to 3 are views illustrating a power outlet device according to an exemplary embodiment of the present disclosure.

As illustrated in the figures, the power outlet device according to the present disclosure includes a housing 10 having a plug insertion hole 11 inserted with a plug 5, a terminal 20 installed in the housing 10, and a switch unit 30 controlling whether to supply power to the terminal 20 by sensing that the plug 5 is inserted into the terminal 20.

The housing 10 has the plug insertion hole 11 on the top thereof as illustrated in FIG. 2. The plug insertion hole 11 has an appropriate size so that a plug pin 6 of the plug 5 is inserted into the plug insertion hole 11. For example, in a structure in which two plug pins 6 are provided in the plug 5, the plug insertion holes 11 may also be constituted by two plug insertion holes 11 to correspond thereto.

Further, the housing 10 is installed to open/close a cover 15 that may cover the top of the plug insertion hole 11 as illustrated in FIG. 3.

In addition, a substrate 18 with a power supply circuit, and the like is installed in the housing 10.

The terminal 20 is installed on the substrate 18 in the housing 10 and deployed to face the plug insertion hole 11 of the housing 10. The number of terminals 20 is the same as that of the plug insertion hole 11.

In the terminal 20, a pair of conductive strips 21 and 22 are spaced apart from each other and the conductive strips 21 and 22 are made of an elastically transformable conductive material. In particular, the terminal 20 has a structure in which one side of each of the conductive strips 21 and 22 is bent toward inside of the terminal 20 to facilitate electrical connection through elastic transformation when the plug pin 6 of the plug 5 is inserted.

In addition, a sensing opening 23 opened in a lateral direction is formed between the pair of conductive strips 21 and 22.

Meanwhile, a rotation plate (not illustrated) having the plug insertion hole may be rotatably installed on the top of the housing 10, and as a result, a location of the plug insertion hole in the terminal 20 varies by the rotation plate.

The switching unit 30 is configured to control whether to supply the power to the terminal 20 by sensing that the plug 5 is inserted into the terminal 20 and the switching unit 30 is electrically connected to the terminal 20.

An insertion sensing unit 31 is configured to optically sense that the plug 5 is fully inserted into the bottom of the terminal 20 through the sensing opening 23 of the terminal 20.

The switching unit 30 includes the insertion sensing unit 31 that senses that the plug 5 is inserted into the terminal 20.

The insertion sensing unit 31 is configured to sense that the plug pin 6 of the plug 5 is fully inserted into the bottom of the terminal 20. In particular, the insertion sensing unit 31 is preferably configured to optically sense that the plug pin 6 of the plug 5 is fully inserted into the bottom of the terminal 20.

The insertion sensing unit 31 includes a sensing block 32 installed on the substrate 18, a light emitting unit 41 installed at one side of the sensing block 32, and a light receiving unit 42 installed at the other side of the sensing block 32 as illustrated in FIG. 3.

The sensing block 32 is configured in a structure to besiege the sensing opening 23 of the terminal 20 and the sensing block 32 has a first mounting wall 32a and a second mounting wall 32b that are arranged to face each other. The light emitting unit 41 may be mounted on the first mounting wall 32a, the light receiving unit 42 may be mounted on the second mounting wall 32b, and an optical signal transmitted from the light emitting unit 41 may be received by the light receiving unit 42 after passing through the sensing opening 23.

Therefore, when the plug pin 6 of the plug 5 is inserted between the conductive strips 21 and 22 of the terminal 20, the optical signal in the light emitting unit 41 is received by the light receiving unit 42 by passing through the sensing opening 23 to more accurately sense whether to insert the plug 5.

A first mounting groove 43 on which the light emitting unit 41 is mounted extends on the first mounting wall 32a of the sensing block 32 in a longitudinal direction and a second mounting groove 44 on which the light receiving unit 42 is mounted extends on the second mounting wall 32b in the longitudinal direction. As described above, as the first and second mounting grooves 43 and 44 extend in the longitudinal direction, mounting locations of the light emitting unit 41 and the light receiving unit 42 may be variously controlled.

Meanwhile, in the sensing block 32, the plug 5 has two plug pins 6 and the terminal 20 is constituted by two terminals 20 to correspond thereto, as illustrated in FIG. 3. As a result, the sensing block 32 may be configured in an H-type structure to besiege two terminals 20.

A controller 35 is electrically connected to the light emitting unit 41 and the light receiving unit 42 of the insertion sensor and as a result, the controller 35 is configured to output a switching signal by receiving a sensing signal for sensing whether to insert the plug 5 from the insertion sensor 31.

A power supply switching unit 36 is electrically connected to the controller 35, and as a result, the power is configured to be supplied to the terminal 20 by a switching signal of the controller 35.

Meanwhile, a start sensor 37 that outputs a start-on signal by sensing a start of the vehicle is electrically connected to the controller 35, and as a result, the controller 35 may be configured to output the switching signal according to the sensing signal of the insertion sensor 37 in the state where the control unit 35 receives the start-on signal of the start sensor 37.

According to the exemplary embodiments of the present disclosure, whether a plug is fully inserted into a terminal is accurately sensed to more accurately control whether to supply power to the terminal. For example, since the power is not supplied to the terminal as the insertion of the plug is not sensed even though foreign materials or other conductive materials intrude in or are inserted into the terminal, and as a result, safety thereof can be secured, the safety can be significantly improved and structural simplification is implemented to significantly save manufacturing cost through simplification of an assembly process.

Since it is sensed that the plug is fully inserted into a lower end of the terminal to more accurately safely sense whether to insert the plug, it is advantageous of accurately controlling whether to supply the power to the terminal.

Although detailed exemplary embodiments of the present disclosure have been described, the present disclosure is not limited by the exemplary embodiments disclosed in the specification and the accompanying drawings, and may be variously modified by those skilled in the art within the scope without departing from the technical spirit of the present disclosure.

What is claimed is:

1. A power outlet device comprising:
a housing having a pair of plug insertion holes inserted with an external plug;
a substrate provided in the housing;
a pair of terminals provided on the substrate to face the pair of plug insertion holes; and
a switching unit controlling whether to supply power to the pair of terminals by sensing that the plug is inserted into the pair of terminals,
wherein the switching unit includes an insertion sensor sensing that the plug is inserted into the pair of terminals,
wherein the pair of terminals are electrically connected to the switching unit,
wherein the insertion sensor comprises a sensing block provided separately from the substrate and installed on the substrate,
the sensing block including:
a first mounting wall and a second mounting wall disposed on the substrate in a direction perpendicular to a direction in which the pair of terminals are arranged;
a connecting wall extending in the direction in which the first and second mounting walls are disposed to connect the first and second mounting walls such that the second mounting wall is fixed in position relative to the first mounting wall;
a light emitting unit mounted on the first mounting wall facing the pair of terminals; and
a light receiving unit mounted on the second mounting wall facing the light emitting unit such that the light receiving unit is fixed in position relative to the light emitting unit.

2. The power outlet device according to claim 1, wherein the insertion sensor has an optical sensing structure to sense that the plug is fully inserted into the bottom of the terminal.

3. The power outlet device according to claim 1, wherein:
the switching unit further includes
a controller outputting a switching signal by receiving a sensing signal from the insertion sensor, and
a power supply switching unit configured to supply the power to the pair of terminals by the switching signal of the controller.

4. The power outlet device according to claim 3, wherein:
a start sensor that outputs a start-on signal by sensing a start of a vehicle is electrically connected to the controller, and
the controller is configured to output the switching signal in accordance with the sensing signal of the insertion sensor in the state where receiving the start-on signal of the start sensor.

5. The power outlet device according to claim 1, wherein:
each of the pair of terminals has a pair of conductive strips which are spaced apart from each other and a sensing opening opened in a lateral direction is formed between the pair of conductive strips, and
the insertion sensor is configured to optically sense that the plug is fully inserted into the bottom of the pair of terminals through the sensing opening of the pair of terminals.

6. The power outlet device according to claim 5, wherein:
the sensing block having a structure to besiege the sensing openings of the pair of terminals, and
optical signal transmitted by the light emitting unit is received by the light receiving unit after passing through the sensing opening.

7. The power outlet device according to claim 6, wherein a first mounting groove on which the light emitting unit is mounted extends on the first mounting wall in a longitudinal direction and a second mounting groove on which the light receiving unit is mounted extends on the second mounting wall in the longitudinal direction.

8. The power outlet device according to claim 1, wherein a rotation plate having a plug insertion hole is rotatably installed on the top of the housing.

9. The power outlet device according to claim 1, wherein the connecting wall extends between the pair of terminals such that the sensing block has an H-shaped structure as a whole and is configured to besiege the pair of terminals.

10. A power outlet device comprising:
a housing having a pair of plug insertion holes inserted with an external plug;
a pair of terminals deployed to face the pair of plug insertion holes in the housing; and
a switching unit controlling whether to supply power to the pair of terminals by sensing that the plug is inserted into the pair of terminals,
wherein the switching unit includes an insertion sensor sensing that the plug is inserted into the pair of terminals,
wherein the insertion sensor comprises a sensing block installed on the substrate,
the sensing block including:
a first mounting wall and a second mounting wall disposed on the substrate in a direction perpendicular to a direction in which the pair of terminals are arranged;
a connecting wall extending in the direction in which the first and second mounting walls are disposed to connect the first and second mounting walls such that the second mounting wall is fixed in position relative to the first mounting wall;
a light emitting unit mounted on the first mounting wall facing the pair of terminals; and a light receiving unit mounted on the second mounting wall facing the light emitting unit such that the light receiving unit is fixed in position relative to the light emitting unit.

11. The power outlet device according to claim 10, wherein:

the switching unit includes a controller outputting a switching signal by receiving a sensing signal from the insertion sensor, and a power supply switching unit configured to supply the power to the terminal by the switching signal of the controller.

12. The power outlet device according to claim 11, wherein:

a start sensor that outputs a start-on signal by sensing a start of a vehicle is electrically connected to the controller, and the controller is configured to output the switching signal in accordance with the sensing signal of the insertion sensor in the state where receiving the start-on signal of the start sensor.

\* \* \* \* \*